United States Patent [19]

Cook

[11] 4,386,899
[45] Jun. 7, 1983

[54] INJECTOR FOR PLASTIC MOLDS

[75] Inventor: James E. Cook, Clarkston, Mich.

[73] Assignee: Morrell Company, Troy, Mich.

[21] Appl. No.: 287,112

[22] Filed: Jul. 27, 1981

[51] Int. Cl.³ ............................................. B29F 1/03
[52] U.S. Cl. .................................. 425/225; 425/549;
425/566; 425/568
[58] Field of Search ............... 425/549, 564, 565, 566,
425/568, 225

[56] References Cited

U.S. PATENT DOCUMENTS

| 2,551,439 | 5/1951 | Kovacs . | |
|---|---|---|---|
| 3,247,304 | 4/1966 | Ninneman | 425/558 X |
| 4,260,348 | 4/1981 | Graham | 425/549 X |
| 4,260,359 | 4/1981 | Dannels | 425/549 X |
| 4,334,847 | 6/1982 | Schauffele | 425/566 X |

FOREIGN PATENT DOCUMENTS 1277030  6/1972  United Kingdom ................ 425/565

Primary Examiner—Thomas P. Pavelko
Attorney, Agent, or Firm—Harold W. Milton, Jr.

[57] ABSTRACT

A material injection assembly (10) of the type for injecting a resin material into a mold cavity including a body member (12) defining a nozzle (13) for injecting material into a mold (14) and including at least one central channel (16) for conveying a first material through the nozzle (13). The assembly is characterized by an internal purging mechanism for closing the nozzle (13) to the mold (14) while allowing the flow of purging material between the channel (18) supplying resin material to the control channel (16) and a debris channel (22). The purging mechanism further allows flow of purging material between a separate purging material channel (20) and the debris channel (22) to perform a post-purge function.

A cooling system is also disclosed which provides a coolant supply channel (70) which bifurcates into two channels (75, 77) about the central channel (16) proximal to the nozzle (13) to provide maximum cooling at the portion of the assembly (13) closest to the mold (14).

13 Claims, 6 Drawing Figures

INJECTOR FOR PLASTIC MOLDS

TECHNICAL FIELD

The instant invention relates to an injection valve assembly which is capable of injecting a first material, such as a resin, into the cavity of a mold.

BACKGROUND ART

Prior art injection valve assemblies generally include a nozzle which is operatively connected to a mold and means for injecting resin material into the mold. Usually a hydraulic cylinder controls an axially displaceable pin disposed within the main channel of the nozzle. The pin opens and closes the channel to control the flow of the resin material therethrough. In order to purge the system for a different material or for a shutdown of the assembly, the mold is spread open and the system is externally purged by running solvent through the assembly and out of the nozzle. This purging operation is quite sloppy and, accordingly, grossly inefficient. An example of such a device is shown in the U.S. Pat. No. Re. 28,721 to Farrell. The Farrell patent teaches an injection nozzle assembly including a valve having a first position which allows flow of material between a first and second passageway. The valve further has a second position which closes off the passage of material between the passageways. However, the Farrell patent does not teach an injection nozzle assembly including a valve for controlling internal purging of the injection nozzle or for controlling post-purge flushing of the system.

The U.S. Pat. No. 2,551,439 to Kovacs and U.S. Pat. No. 4,260,348 to Graham are also pertinent in regard to the instant invention. Kovacs and Graham both disclose injection nozzles including internal coolant circulation channels. However, neither of the two above-cited patents disclose an internal coolant circulation channel which bifurcates about the portion of the assembly nearest to the mold, the bifurcation providing the greatest amount of cooling capacity at the portion of the assembly which is exposed to the greatest heat.

STATEMENT OF THE INVENTION AND ADVANTAGES

In accordance with the present invention, there is provided a material injection assembly including a body member defining a nozzle for injecting material into a mold and including at least one central channel for conveying a first material through the nozzle. The assembly is characterized by internal purging means for closing the nozzle to the mold while purging the central channel of the first material.

The instant invention further provides a coolant supply channel extending substantially parallel to the central channel, the coolant channel bifurcating about the central channel proximal to the nozzle.

The instant invention provides an improvement over the prior art in that it includes a nozzle having internal purge and post-purge functions.

FIGURES IN THE DRAWINGS

An embodiment of a material injection assembly constructed in accordance with the present invention will now be described by way of example only, with reference to the accompanying drawings, in which.

DETAILED DESCRIPTION OF THE DRAWINGS

Referring to the FIGURES, a material injection assembly constructed in accordance with the instant invention is generally shown at 10.

Figure 1:
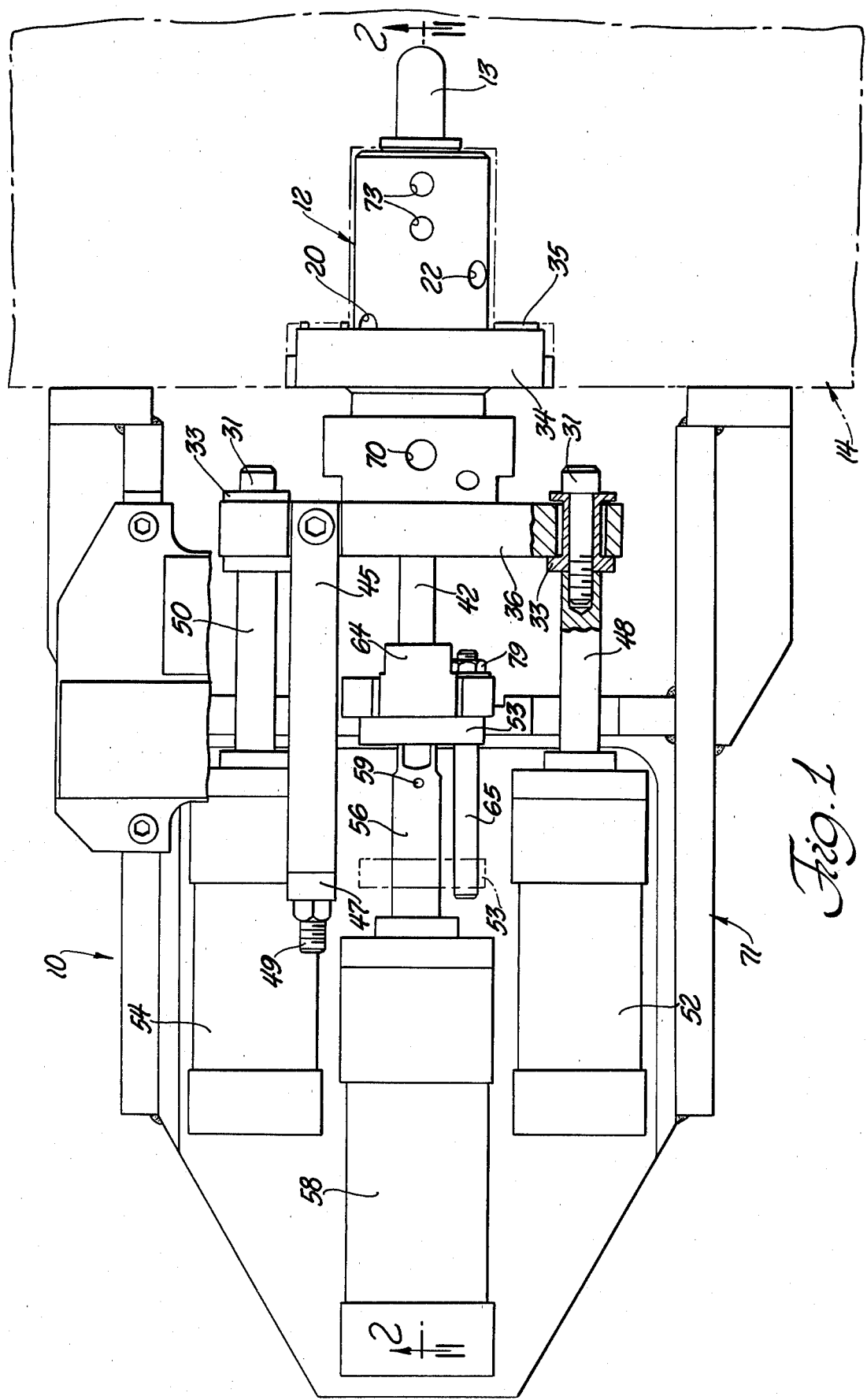
FIG. 1 is a longitudinal view partially in cross section showing a material injection assembly constructed in accordance with the instant invention.
Figure 2:
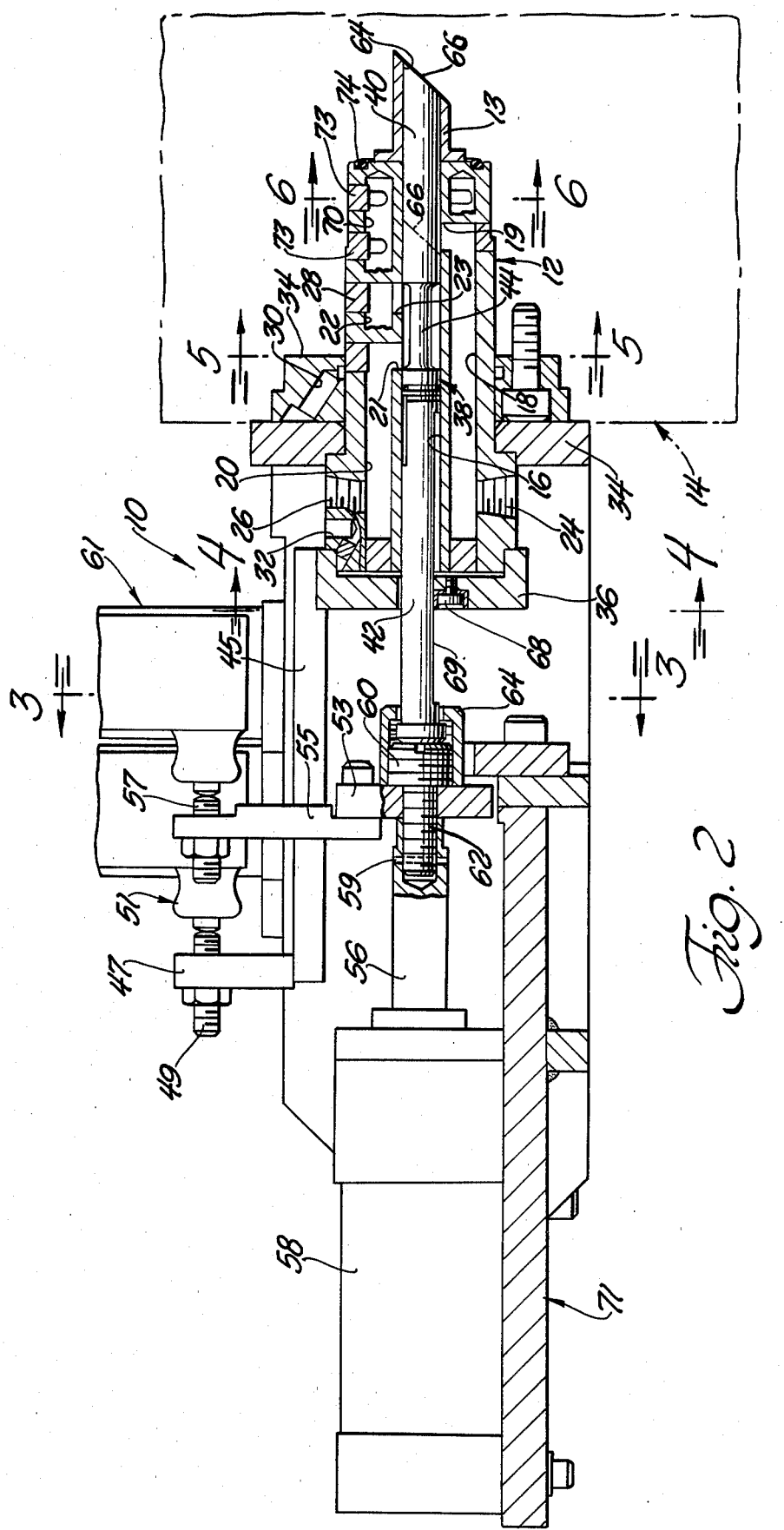
FIG. 2 is a cross-sectional view taken substantially along lines 2—2 of FIG. 1.
Figure 5:
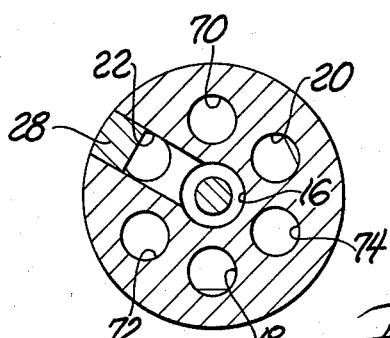
FIG. 5 is a cross-sectional view taken substantially along lines 5—5 of FIG. 2.

The assembly 10 includes a body member generally indicated at 12 defining a nozzle 13 for injecting material into a mold 14, as shown in FIGS. 1 and 2. The body member 12 includes a central channel 16 for conveying a first material, such as a plastic resin, through the nozzle 13. The body member 12 further includes a material supply channel 18 having an inlet 19 in communication with the central channel 16. The material supply channel 18 is also in communication with input mixers for supplying the resin material to the injection assembly 10. A purging material channel 20 has an inlet 21 in communication with the central channel 16. The purging material channel also communicates with a solvent source for selectively supplying a solvent to the subject assembly 10. The body member 12 further includes a debris channel 22 having an inlet 23 in communication with the central channel 16. The debris channel 22 functions to remove resin material and solvent from the assembly 10, as will be described below. The channels 18, 20 and 22 are bored into the body member 12, the entrance to the bores being plugged by threaded plug members, like plug 28 which plugs the bore between passages 22 and 16, as best shown in FIG. 5. The channel 18 has a threaded inlet 24 for receiving a feed line. Likewise, channel 20 has a threaded inlet 26. Ports 30 and 32 are passageways for the provision of lubrication to the body member.

The body member 12 is slidably mounted on guide 34 which is provided with insulation 35 thereabout. A crossbar 36 provides additional support.

The assembly is characterized by including internal purging means for closing the central channel 16 to the mold 14 while purging the central channel 16 of the resin material therein. In other words, resin material is flushed from the assembly 10 without having to go through the nozzle 13. This internal purging function is a significant improvement over the sloppy and inefficient methods of prior art assemblies wherein the mold is spread open from the nozzle and solvent is flushed through and out of the nozzle member.

The internal purging means includes valve means generally indicated at 38, disposed within the central channel 16. The valve means 38 includes an elongated rod member 38 including first and second end portions 40 and 42, respectively, in sliding engagement with and conforming with the central channel 16. The rod member 38 further includes a middle or waist portion 44 which is smaller than the central channel 16. The rod member 38 is moveable relative to the body portion 12.

The rod 38 has a purging position for establishing communication between the material supply channel 18 and the debris channel 22 and a post-purging position for establishing communication between the purging material supply channel 20 and the debris channel 22. A first actuator means consists of a pair of piston rods 48 and 50 driven by a pair of hydraulic cylinders 52 and 54, respectively. Piston rods 48 and 50 are connected to the crossbar 36 by bolts 31 which extend through bushings 31. The piston rods 48 and 50 selectively move the body member 12 between an inoperative position when the piston rods 48 and 50 are retracted wherein the rod member 38 is in the purging position and a second operative position when the piston rods 48 and 50 are extended wherein the rod member 38 is in the post-purging position. The first position is inoperative, since the assembly cannot supply resin to a mold when the body member 12 is in the retracted position. More specifically, a purging function is generally necessary to flush the material supply channel 18 with solvent to remove the remaining plastic resin material in between various runs or before a shutdown. In doing so, solvent is washed through the material supply channel 18. Prior to receiving the solvent, the body member 12 is moved to the first position (the hydraulic cylinders retract the pistons 48 and 50, thusly move the body member 12 towards the hydraulic cylinders 52 and 54) so that the middle portion 44 extends between inlets 19 and 23. Thusly, the middle portion 44 of the rod member 38 allows flow between the material supply channel 18 and the debris channel 22. The solvent enters the material supply channel 18, flows through the central channel 16 about the middle portion 44 of the rod member 38 and exits through the debris channel 22. Thusly, the resin material is flushed from the nozzle assembly without having to go through the mold 14.

In order to prime the assembly for a new run, the body member 12 is again moved to the first position wherein the middle portion 44 extends between inlets 19 and 23. Since it is necessary to flush the solvent from entering the mold 14, the plastic resin material for the new run is allowed to flow through the material supply channel 18 and across the middle portion 44 of the rod member 38, thereby flushing the solvent out through the debris channel 22. The body member 12 is moved to the operational position and the material supply channel 18 is primed for injection of the plastic resin material into the mold 14. The remaining problem is that there is plastic resin material remaining in the debris channel 22 and there is sufficient heat from the mold 14 conducted through the assembly 10 to cure the resin material within the debris channel 12. To solve this problem, solvent is injected to flow through the purging material supply channel 20, across the middle portion 44 of the rod member 38, and through the debris channel 22, thereby flushing the plastic resin material from the debris channel 22. This position of the assembly is illustrated in FIG. 2. Thusly, a post-purge function is performed wherein the assembly is primed for injection of the plastic resin material.

Bracket members 45 and 47 are connected to the body member 12. An adjustable set screw 49 contacts a limit switch assembly, generally shown at 51. When the body member 12 is in the second, extended position, the adjustable stop engages a plunger in the limit switch assembly 51 to provide a signal indicating to the control system (not shown) that the body member 12 is in that position.

The assembly 10 further includes second actuator means consisting of a piston 56 actuated by a hydraulic cylinder 58 for moving the rod member 38 between an extended position (solid line shown in FIGS. 1 and 2) wherein the first end portion 40 closes the material supply channel 18 to the central channel 16 and a retracted position (hatched line shown in FIGS. 1 and 2) wherein the material supply channel 18 is open to the central channel 16. Thusly, the end portion 40 of the rod member 38 controls flow of resin material into the main channel 16 and the mold 14 communicating therewith.

As shown in FIG. 2, the piston rod 56 includes an internally threaded female end portion. A connector member 60 interconnects the second end portion 42 of the rod member 38 to the piston rod 56 by providing a threaded male portion 62 thereof which is secured within the threaded female portion of the piston rod 56. Pin 59 prevents relative rotation between the piston rod 56 and connector 60. As shown in FIG. 1, a housing 64 is threadedly secured to the connector 60 and engages the terminal portion of the end portion 42 of the rod member 38. Bracket 53 is secured between the connector 60 and piston rod 56. Bracket 55 is connected to bracket 53 and includes an adjustable screw 57 connected thereto. The screw 57 actuates a limit switch assembly, generally shown at 61, when the rod member 38 is in the extended position. Thusly, the signal from the limit switch assembly 61 indicates to the control system that the rod member 38 is in the extended position.

A rod member 65 is fixedly secured to the assembly support structure 71 by nut member 79. Bracket 53 slidably engages the rod member 65 whereby the rod member 65 prevents rotation of the brackets 53 and 55 ensuring consistent alignment of screw 57 with the limit switch 61.

The nozzle 13 includes an outlet port 64 which is tapered or contoured to a predetermined shape. The shape of the outlet port 64 corresponds to the shape of the inlet port or wall of the mold 14. The first end portion 40 of the rod member 38 includes an end surface 66 which is shaped to the same predetermined shape and is coplanar with the outlet port 64 when the rod member 38 is in the extended position. In other words, when the body member 12 is in the operational position and the rod member 38 is in the extended position, the end surface 66 of the first end portion 40 of the valve means 38 is flush with the outlet port 64 of the nozzle 13.

Figure 3:
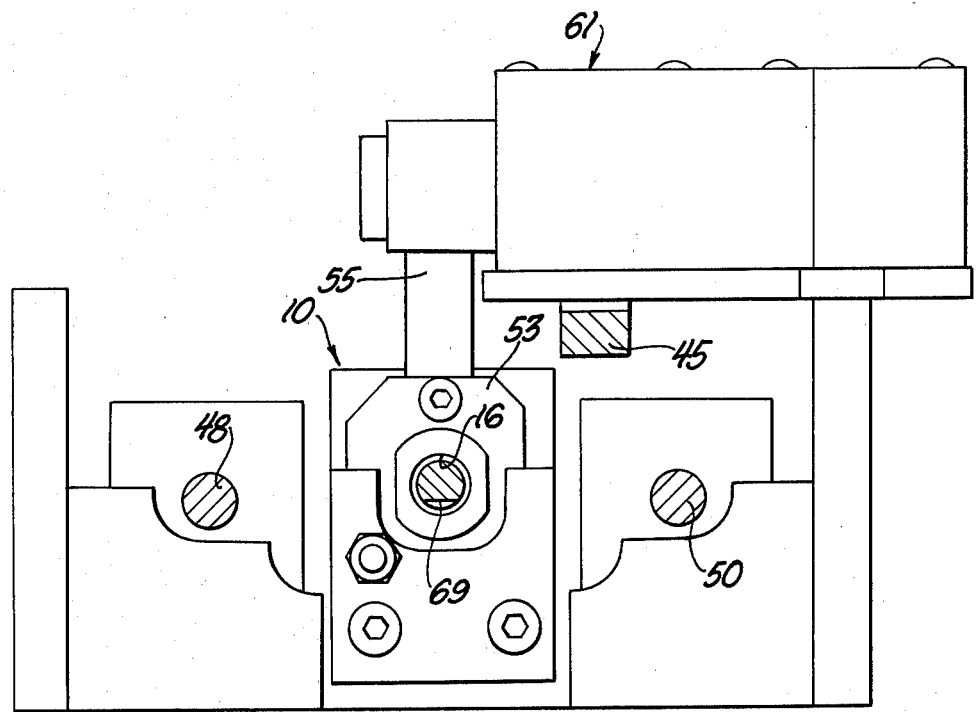
FIG. 3 is a cross-sectional view taken substantially along lines 3—3 of FIG. 2.
Figure 4:
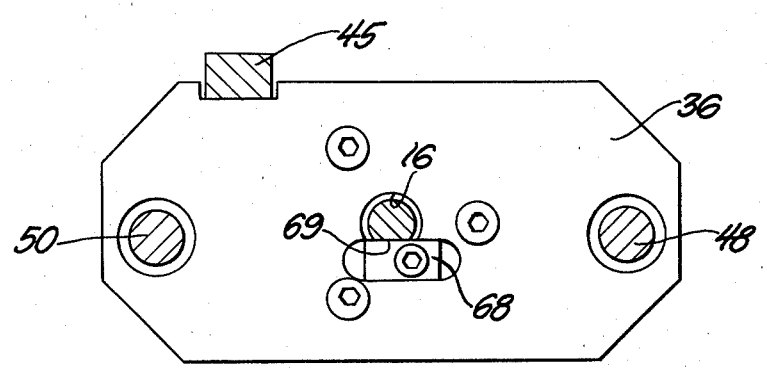
FIG. 4 is a cross-sectional view taken substantially along lines 4—4 of FIG. 2.

The instant invention further includes antirotation means for preventing rotation of the rod member 38. It is essential to prevent rotation of the rod member 38 to maintain the end surface 66 flush with the outlet port 64. The antirotation means includes a key member 68 as shown in FIG. 4. The second end portion 42 of the rod member 38 includes a longitudinal portion thereof having a flat surface 69, as shown in FIGS. 2, 3 and 4. The flat surface of the key member 68 abuts the flat surface 69 of the second end portion 42 of the rod member 38 for allowing axial movement of the rod member 38 while preventing rotation thereof. Thusly, the key member 68 maintains the angled or contoured end surface 66 flush with the tapered or contoured outlet port 64. Of course, other means can be utilized to prevent rotation of the rod member 38 in accordance with the instant invention.

Figure 6:
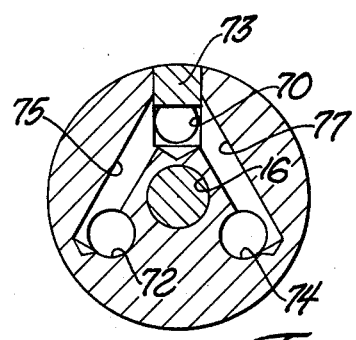
FIG. 6 is a cross-sectional view taken substantially along lines 5—5 of FIG. 2.

The body member 12 further includes a coolant supply channel 70. The channel 70 is bored into the body member 12, the bores being sealed by plug members 73. The coolant supply channel 70 extends substantially parallel to the central channel 16. The coolant supply channel 70 bifurcates about the central channel 16 proximal to the nozzle 13 into two channels 75 and 77 which are substantially perpendicular to said coolant supply channel 70, as shown in cross section in FIG. 6. The channel 75 and 77 communicate with two coolant return channels 72 and 74, respectively, for returning the coolant for recirculation. The bifurcation 75, 77 is located in the portion above the body member 12 nearest to the mold 14. Since heat is conducted from the mold 14 to the injection assembly 10 and the nozzle portion 13 of the assembly 10 is nearest to the mold 14, the bifurcation 75, 77 of the coolant channel 70 provides the greatest amount of cooling capacity at the portion nearest the portion of the assembly 10 which is exposed to the greatest heat.

In operation, the subject material injection assembly 10 is mounted on the support structure 71 and the assembly 10 is connected to a mold 14 for the injection molding operation. A ring seal 74 is disposed about the nozzle 13 and positioned against the mold surface. To inject material into the mold 14, the rod member 38 is moved to the retracted position by the hydraulic cylinder 58 actuating movement of the rod 56. In this retracted position, the first end portion 40 of the rod member 38 is to the left of the inlet 19 to the central channel 16 from channel 18, but with the first end portion 40 covering the inlet 23 from channel 22 to channel 16. Thusly, the material supply channel 18 is open to the central channel 16 to allow flow of material into the mold 14. To stop the flow, the rod member 38 is hydraulically actuated to the extended position.

To purge the assembly, prior to receiving the purging material, the body member 12 is moved to the inoperative position so that the middle waist portion 44 of the rod member 38 allows flow between the material supply channel 18 and the debris channel 22. Flushing solvent enters through the material supply channel 18 and inlet 19 to the central channel 16, across the middle waist portion 44, and exits through the debris channel 22. Thusly, material is flushed from the assembly 10 without having to go through the mold 14 and without spreading open the nozzle 13 from the mold 14. In order to prime the assembly 10 for a new run, the body member 10 is moved to the inoperative retracted position. Since it is necessary to flush the purging material from the material supply channel 18 to prevent the purging material from entering the mold 14, the material for the new run is allowed to flow through channel 18 and across the middle waist portion 44 of the rod member 38, thereby flushing the purging material out through the debris channel 22. The body member 12 is then actuated to move to the extended operative position and the assembly 10 is primed for injection of material into the mold 14. Purging material is injected to flow through purging material channel 20, across the middle waist portion 44, and through the debris channel 22, thereby flushing the material remaining within the debris channel 22 which otherwise would be set by the heat from the adjoining mold 14. Thusly, the post purge function is performed.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A material injection assembly (10) comprising: a body member (12) defining a nozzle (13) for injecting material into a mold (14) and including at least one central channel (16) for conveying a first material through said nozzle (13) and characterized by internal purging means for closing said central channel (16) to the mold (14) and a fluid channel means for admitting a purging fluid to purge said central channel (16) of the first material.

2. A material injection assembly as set forth in claim 1 wherein said body member (12) further includes a material supply channel (18) in communication with said central channel (16) and said fluid channel means including a purging material channel (20) in communication with said central channel (16) and a debris channel (22) in communication with said central channel (16), said internal purging means including valve means (38) disposed within said central channel (16) having a purging position for establishing communication between said material supply channel (18) and said debris channel (22) and a postpurging position for establishing communication between said purging material channel (20) and said debris channel (22).

3. A material injection assembly as set forth in claim 2 wherein said internal purging means includes first actuator means (48, 50, 52, 54) for selectively moving said body member (12) between a first position wherein said valve means (38) is in said purging position and a second position wherein said valve means (38) is in said post-purging position.

4. A material injection assembly as set forth in claim 3 wherein said valve means (38) includes an elongated rod member (38) including a first and second end portions (40, 42) in sliding engagement with and conforming with said central channel (16) and a middle portion (44) being smaller than said central channel (16), said middle portion (44) being moveable relative to said body portion (12) for establishing communication between said material supply channel (18) and said debris channel (22) when said valve means (38) is in said purging position and for establishing communication between said purging material channel (20) and said debris channel (22) when said valve means (38) is in said post-purging position.

5. A material injection assembly as set forth in claim 4 including second actuator means (56, 58) for moving said rod member (38) between an extended position wherein said first end portion (40) closes said material supply channel (18) to said central channel (16) and a retracted position wherein said material supply channel (18) is open to said central channel (16).

6. A material injection assembly as set forth in claim 5 wherein said nozzle (13) includes an outlet port (64) contoured to a predetermined shape, said first end portion (40) of said rod member (38) including an end surface (64) contoured to said same predetermined shape and being coplanar with said outlet port (64) when said rod member (38) is in said extended position.

7. A material injection assembly as set forth in claim 5 including antirotation means for preventing rotation of said rod member (38).

8. A material injection assembly as set forth in claim 7 wherein said second end portion (42) of said rod member (38) includes a longitudinal portion thereof having a flat surface, said antirotation means including a key member (68) having a flat surface abutting said flat surface of said rod member (38) for allowing axial movement of said rod member (38) while preventing rotation thereof.

9. A material injection assembly as set forth in claim 8 wherein said body member (12) includes a coolant supply channel (70) extending substantially parallel to said central channel (16), said coolant supply channel (70) bifurcating about said central channel (16) proximal to said nozzle (13).

10. A material injection assembly as set forth in claim 1 wherein said nozzle (13) includes an outlet port (64) contoured to a predetermined shape, said internal purging means including a rod member (38) moveable between an extended position wherein said rod member (38) closes said central channel (16) and a retracted position wherein said central channel (16) is open, said rod member (38) including an end portion surface (66) contoured to said same predetermined shape and being coplanar with said outlet port (64) when said rod member (38) is in said extended position.

11. A material injection assembly as set forth in claim 10 including antirotation means for preventing rotation of said rod member (38).

12. A material injection assembly as set forth in claim 11 wherein said rod member (38) includes a longitudinal portion thereof having a flat surface, said antirotation means including a key member (68) having a flat surface abutting said flat surface of said rod member (38) for allowing axial movement of said rod member (38) while preventing rotation thereof.

13. A material injection assembly as set forth in claim 12 wherein said body member (12) includes a coolant supply channel (70) extending substantially parallel to said central channel (16), said coolant supply channel (7) bifurcating about said central channel (16) proximal to said nozzle (13).

* * * * *